(12) United States Patent
Saine

(10) Patent No.: US 10,864,544 B2
(45) Date of Patent: Dec. 15, 2020

(54) APPLICATOR WITH AT LEAST ONE PUMP HAVING AN INTEGRATED DRIVE

(71) Applicant: NORDSON CORPORATION, Westlake, OH (US)

(72) Inventor: Joel E. Saine, Dahlonega, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 15/697,981

(22) Filed: Sep. 7, 2017

(65) Prior Publication Data

US 2018/0065141 A1 Mar. 8, 2018

Related U.S. Application Data

(60) Provisional application No. 62/385,238, filed on Sep. 8, 2016.

(51) Int. Cl.
*B05C 11/10* (2006.01)
*B05C 5/02* (2006.01)
(Continued)

(52) U.S. Cl.
CPC ...... *B05C 11/1007* (2013.01); *B05B 11/3049* (2013.01); *B05B 15/65* (2018.02); *B05C 5/02* (2013.01); *B05C 5/0225* (2013.01); *B05C 5/0279* (2013.01); *B05C 11/025* (2013.01); *B05C 11/1026* (2013.01); *B05C 11/1042* (2013.01); *B05C 11/1044* (2013.01); *B05C 19/008* (2013.01); *B01F 5/108* (2013.01);
(Continued)

(58) Field of Classification Search
None
See application file for complete search history.

(56) References Cited

U.S. PATENT DOCUMENTS 5,228,594 A * 7/1993 Aslin ............ B67D 7/02
222/63
5,236,641 A * 8/1993 Allen ............ B05C 11/1044
264/210.8
(Continued)

FOREIGN PATENT DOCUMENTS

CN 200999361 Y 1/2008
CN 103384569 A 11/2013
(Continued)

OTHER PUBLICATIONS

ISA/220—Notification of Transmittal or Search Report and Written Opinion of the ISA, or the Declaration dated Jan. 8, 2018 for WO Application No. PCT/US17/050380.
(Continued)

*Primary Examiner* — Binu Thomas
(74) *Attorney, Agent, or Firm* — Baker & Hostetler LLP

(57) ABSTRACT

An applicator for dispensing adhesive onto a substrate is described. The applicator includes a manifold and at least one dispensing module coupled to the manifold. The applicator may include a least one pump assembly removably mounted to the manifold. Each pump assembly can have an outlet in flow communication with the manifold, and an inlet in flow communication with the adhesive. The use of a removable, independently controllable pump assembly can provide an operator of the applicator greater flexibility during adhesive dispensing.

21 Claims, 13 Drawing Sheets

(51) Int. Cl.
  B05B 15/65 (2018.01)
  B05C 11/02 (2006.01)
  B05B 11/00 (2006.01)
  B05C 19/00 (2006.01)
  *F04C 2/18* (2006.01)
  *F04C 11/00* (2006.01)
  *B01F 5/10* (2006.01)
  *B01F 5/14* (2006.01)
  *F04B 49/20* (2006.01)
  *F04D 15/00* (2006.01)
  *B05B 9/04* (2006.01)
  *B05C 5/00* (2006.01)
  *B32B 37/12* (2006.01)
  *F04C 14/08* (2006.01)

(52) U.S. Cl.
  CPC ............. *B01F 5/14* (2013.01); *B05B 9/0403* (2013.01); *B05C 5/001* (2013.01); *B05C 5/027* (2013.01); *B05C 5/0258* (2013.01); *B05C 11/1002* (2013.01); *B05C 11/1039* (2013.01); *B32B 37/1284* (2013.01); *F04B 49/20* (2013.01); *F04C 2/18* (2013.01); *F04C 11/001* (2013.01); *F04C 14/08* (2013.01); *F04D 15/0066* (2013.01)

(56) References Cited

U.S. PATENT DOCUMENTS

| | | | |
|---|---|---|---|
| 5,409,642 A | 4/1995 | Allen et al. | |
| 5,620,315 A * | 4/1997 | Pfuhler | F04C 14/185 418/21 |
| 5,632,938 A | 5/1997 | Buehning, Sr. | |
| 5,727,933 A | 3/1998 | Laskaris et al. | |
| 5,862,986 A | 1/1999 | Bolyard et al. | |
| 6,089,413 A | 7/2000 | Riney et al. | |
| 6,210,141 B1 | 4/2001 | Allen | |
| 6,296,463 B1 | 10/2001 | Allen | |
| 6,422,428 B1 | 7/2002 | Allen et al. | |
| 6,517,891 B1 | 2/2003 | Estelle et al. | |
| 6,607,104 B2 | 8/2003 | McGuffey | |
| 6,688,498 B1 * | 2/2004 | McGuffey | B05C 5/0279 222/333 |
| 7,699,243 B2 | 4/2010 | Starke | |
| 7,908,997 B2 | 3/2011 | Lessley et al. | |
| 8,445,061 B2 | 5/2013 | McGuffey | |
| 8,561,656 B2 | 10/2013 | Eginton et al. | |
| 9,126,222 B2 | 9/2015 | McGuffey | |
| 9,168,554 B2 | 10/2015 | Saine et al. | |
| 9,415,415 B1 | 8/2016 | Jones | |
| 9,427,766 B2 | 8/2016 | Varga | |
| 9,573,159 B2 | 2/2017 | McGuffey | |
| 9,889,599 B2 | 2/2018 | Ayers | |
| 9,925,552 B2 | 3/2018 | Saine | |
| 2001/0024618 A1 | 9/2001 | Winmill | |
| 2002/0102324 A1 | 8/2002 | Groleau | |
| 2002/0139818 A1 | 10/2002 | McGuffey | |
| 2003/0062384 A1 | 4/2003 | McGuffey | |
| 2004/0099752 A1 | 5/2004 | Boger | |
| 2004/0124251 A1 | 7/2004 | Gressett et al. | |
| 2004/0159672 A1 | 8/2004 | Auber et al. | |
| 2005/0230423 A1 | 10/2005 | Riney et al. | |
| 2005/0242108 A1 | 11/2005 | Harris et al. | |
| 2005/0274317 A1 | 12/2005 | De et al. | |
| 2006/0182887 A1 | 8/2006 | Miller | |
| 2008/0135650 A1 | 6/2008 | Starke | |
| 2008/0169362 A1 | 7/2008 | Kwan et al. | |
| 2009/0214372 A1 | 8/2009 | McGuffey et al. | |
| 2009/0266844 A1 * | 10/2009 | McGuffey | B05C 5/0279 222/146.5 |
| 2012/0048447 A1 | 3/2012 | Burmester et al. | |
| 2013/0108494 A1 * | 5/2013 | Varga | F04C 2/18 418/1 |
| 2014/0161504 A1 | 6/2014 | Duquet et al. | |
| 2015/0125616 A1 | 5/2015 | Trabelsi et al. | |
| 2015/0190837 A1 | 7/2015 | Burmester et al. | |
| 2015/0352588 A1 | 12/2015 | Lessley et al. | |
| 2016/0256889 A1 | 9/2016 | Jones | |
| 2016/0303597 A1 | 10/2016 | McGuffey | |
| 2017/0072624 A1 | 3/2017 | Ayers | |
| 2017/0097019 A1 | 4/2017 | Afshari | |
| 2017/0146035 A1 | 5/2017 | Afshari | |
| 2018/0065133 A1 | 3/2018 | Saine | |
| 2018/0065137 A1 | 3/2018 | Saine | |
| 2018/0065139 A1 | 3/2018 | Saine | |
| 2018/0065140 A1 | 3/2018 | Saine et al. | |
| 2018/0065142 A1 | 3/2018 | Saine | |
| 2018/0252213 A1 | 9/2018 | Afshari | |
| 2018/0266415 A1 | 9/2018 | Afshari | |
| 2018/0291895 A1 | 10/2018 | Afshari | |

FOREIGN PATENT DOCUMENTS

| | | |
|---|---|---|
| CN | 103732100 A | 4/2014 |
| CN | 204412579 U | 6/2015 |
| DE | 4121792 A1 | 1/1993 |
| DE | 202004001480 U1 | 4/2004 |
| EP | 1442798 A2 | 8/2004 |
| EP | 2289633 A2 | 3/2011 |
| EP | 3064279 A1 | 9/2016 |
| EP | 3064280 A1 | 9/2016 |
| JP | 09-173917 A | 7/1997 |
| WO | 93/05212 A2 | 3/1993 |
| WO | 99/54044 A1 | 10/1999 |
| WO | 99/54055 A1 | 10/1999 |
| WO | 2007/084891 A2 | 7/2007 |
| WO | 20111008390 A1 | 1/2011 |
| WO | 20111025603 A1 | 3/2011 |

OTHER PUBLICATIONS

International Patent Application No. PCT/US2017/050406; Int'l Search Report and the Written Opinion; dated Mar. 19, 2018; 19 pages.
ISA/220—Notification of Transmittal or Search Report and Written Opinion of the ISA, or the Declaration dated Dec. 20, 2017 for WO Application No. PCT/US17/050373.
ISA/220—Notification of Transmittal or Search Report and Written Opinion of the ISA, or the Declaration dated Dec. 20, 2017 for WO Application No. PCT/US17/050368.
ISA/206—Invitation to Pay Additional Fees dated Jan. 5, 2018 for WO Application No. PCT/US17/50406.
English Translation of International Preliminary Report on Patentability Chapter II or English Translation of International Preliminary Report on Patentability Chapter I dated Mar. 21, 2019 for WO Application No. PCT/US17/050373.
English Translation of International Preliminary Report on Patentability Chapter II or English Translation of International Preliminary Report on Patentability Chapter I dated Mar. 21, 2019 for WO Application No. PCT/US17/050368.
(IPEA/409) International Preliminary Report on Patentability Chapter II or (IB/373) International Preliminary Report on Patentability Chapter I dated Mar. 21, 2019 for WO Application No. PCT/US17/050380.
English Translation of International Preliminary Report on Patentability Chapter II or English Translation of International Preliminary Report on Patentability Chapter I dated Dec. 13, 2018 for WO Application No. PCT/US17/050417.
(IPEA/409) International Preliminary Report on Patentability Chapter II or (IB/373) International Preliminary Report on Patentability Chapter I dated Mar. 21, 2019 for WO Application No. PCT/US17/050509.
(IPEA/409) International Preliminary Report on Patentability Chapter II or (IB/373) International Preliminary Report on Patentability Chapter I dated Mar. 21, 2019 for WO Application No. PCT/US17/050406.
(IPEA/409) International Preliminary Report on Patentability Chapter II or (IB/373) International Preliminary Report on Patentability

(56) References Cited

OTHER PUBLICATIONS

Chapter I dated Mar. 21, 2019 for WO Application No. PCT/US17/050373.
(IPEA/409) International Preliminary Report on Patentability Chapter II or (IB/373) International Preliminary Report on Patentability Chapter I dated Mar. 21, 2019 for WO Application No. PCT/US17/050368.
(IPEA/408) Written opinion under Chapter II dated Aug. 3, 2018 for WO Application No. PCT/US17/050417.

* cited by examiner

APPLICATOR WITH AT LEAST ONE PUMP HAVING AN INTEGRATED DRIVE

CROSS REFERENCE TO RELATED APPLICATIONS

This application claims the benefit of U.S. Provisional Patent App. No. 62/385,238, filed Sep. 8, 2016, the disclosure of which is hereby incorporated by reference herein.

TECHNICAL FIELD

The present disclosure relates to an applicator for dispensing a hot-melt adhesive onto a substrate having at least one pump with the pump having an integrated drive. The applicator can be a hybrid applicator for having both metered outputs and pressure fed outputs.

BACKGROUND

Typical adhesive applicators for applying hot-melt adhesive onto a substrate contain multiple positive-displacement gear pumps connected to a unitary manifold or segmented manifold (hereafter referred to as a manifold). Multiple modules, each including a nozzle, are applied across the face the manifold as is well known in the industry. These gear pumps have a common drive shaft to turn all the pumps to dispense adhesive. A common drive shaft provides the means to turn the pumps. However, a common drive shaft configuration has drawbacks.

For example, when all of the pumps are the same size, all of the pumps operate at the same speed (rpm) resulting in uniform flow rates from each pump. Furthermore, it is time consuming to change/replace a pump if defective or if a different size is needed, as the common drive shaft and motor must first be removed from the applicator.

In typical applicators, the flow paths between the pumps and the manifolds are somewhat fixed. This, in turn, eliminates the ability to adjust or change adhesive flow streams across the width of the applicator. Furthermore, typical applicators using the pumps described above are considered metered type applicators. However, applicators may be pressure fed. But typical applicators do not include combination of metered feeds and pressure feeds in single applicator design.

BRIEF DESCRIPTION OF THE DRAWINGS

The detailed description of illustrative embodiments of the present application will be better understood when read in conjunction with the appended drawings. For the purposes of illustrating the present application, there is shown in the drawings illustrative embodiments of the disclosure. It should be understood, however, that the application is not limited to the precise arrangements and instrumentalities shown.

DETAILED DESCRIPTION OF ILLUSTRATIVE EMBODIMENTS

Figure 1:
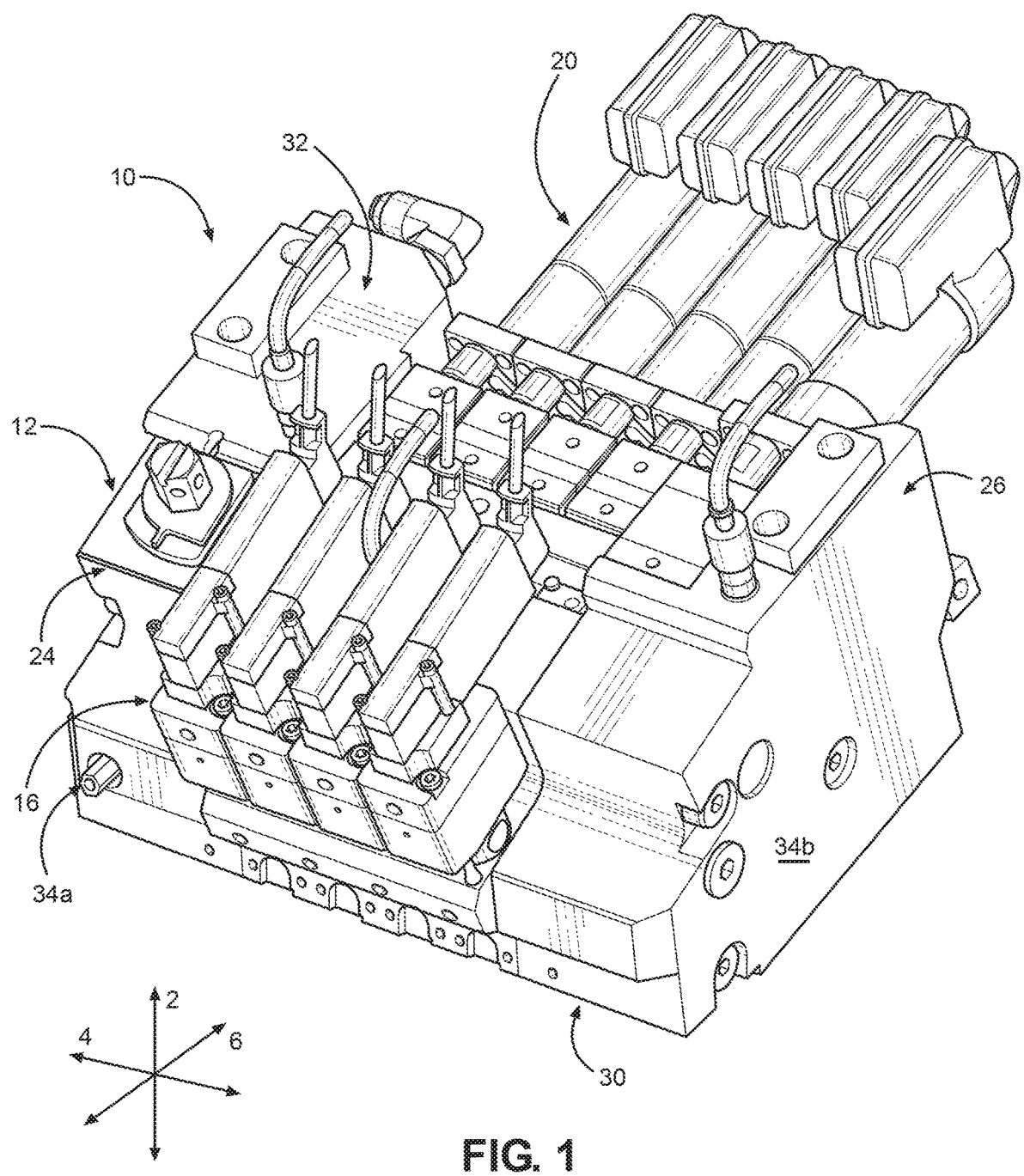
FIG. 1 is a front perspective view of an applicator according to an embodiment of the present disclosure.

Embodiments of the present disclosure include an applicator 10 for dispensing a hot melt adhesive on to a substrate during, for example, the manufacture of personal disposable hygiene products, such as diapers. Referring to FIGS. 1-4, the applicator 10 includes a manifold 12, at least one dispensing module 16 coupled to the manifold 12, at least one air control valve 18 coupled to the dispensing module 16, and at least one pump assembly 20 removably mounted to the manifold 12. The manifold 12 may include a plurality of manifold segments 22 with a pair of end plates 24 and 26 on either side of manifold segments 22. Alternatively, the manifold may be a unitary manifold. The applicator may include a plurality of nozzles (not shown) through with the adhesive is ejected on the substrate. The nozzles can be spray nozzles or coating nozzles.

Figure 2:
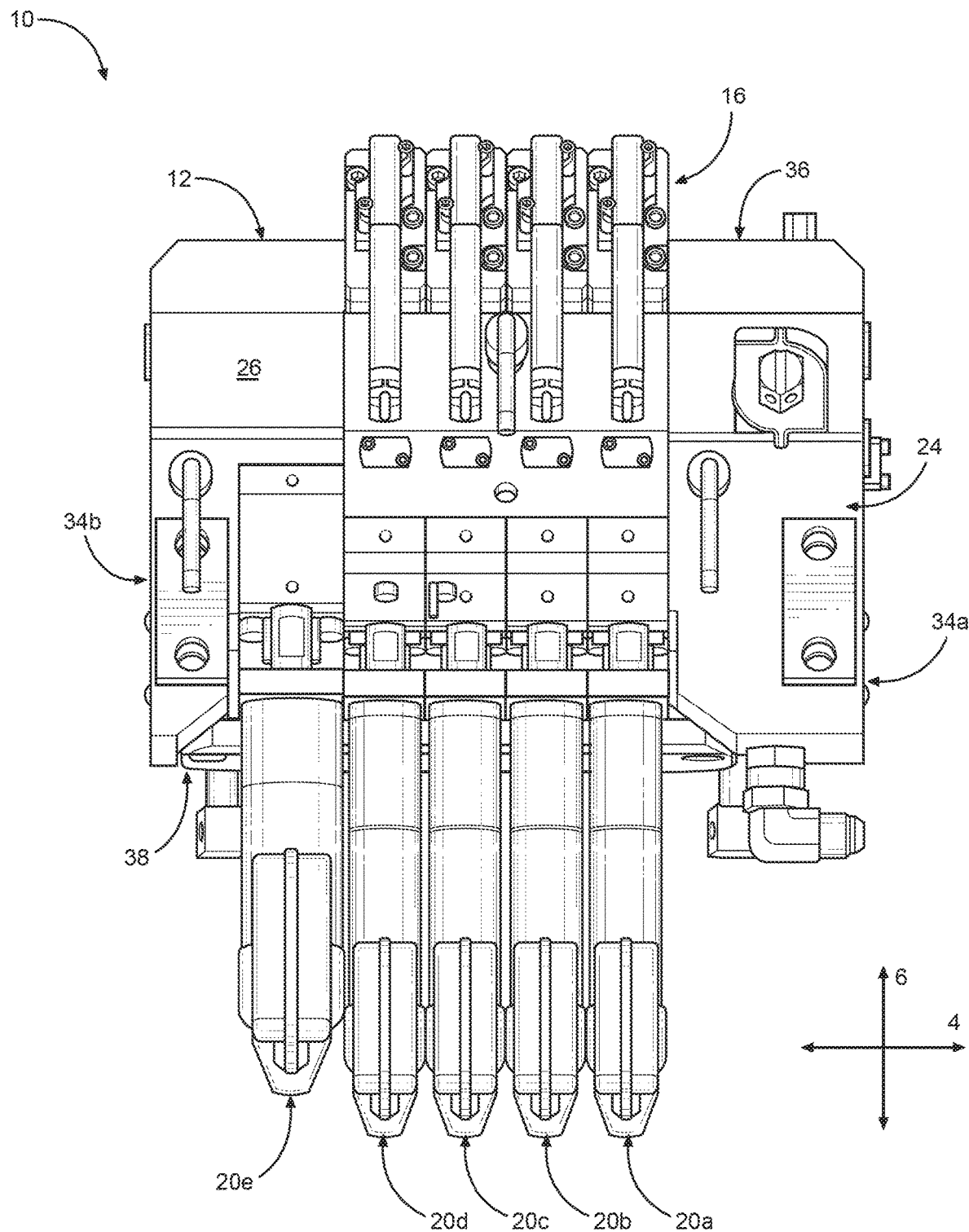
FIG. 2 is a top view of the applicator shown in FIG. 1.

In various embodiments of the present disclosure the applicator 10 may include multiple sets of a dispensing module 16, manifold segment(s) 22, and a pump assembly 20 arranged in a side-by-side relationship to increase the processing width of the applicator 10. Accordingly, the applicator may include a plurality of dispensing modules 16 and a plurality of pump assemblies 20. As illustrated, for example, the applicator 10 has five pump assemblies 20a, 20b, 20c, 20d, and 20e. Although the figures illustrate five pump assemblies 20a-20e, the applicator 10 can include a single pump assembly, two pump assemblies, or more than two pump assemblies. For clarity, a single pump assembly is described below and reference number 20 can be used interchangeably with reference numbers 20a-20e. Each pump assembly 20 can be coupled to and associated with one manifold segment 22 and one dispensing module 16. In addition, each dispensing module 16 is coupled to and associated with one manifold segment 22. However, two or more pump assemblies and two or more dispensing modules 16 may be coupled to single manifold segment 22, as illustrated in FIG. 2.

Referring to FIGS. 1-4, the manifold 12 has a base 30, a top 32 spaced from the base 30 along a vertical direction 2, a first side 34a and a second side 34b opposite the first side 34a along a lateral direction 4 that is perpendicular to the vertical direction 2. The first side 34a lies within a first plane P1 and the second side surface lies within a second plane P2 that is parallel to the first plane P1. The first and second planes P1 and P2 may not be parallel if the first and second sides 34a and 34b are angled with respect to each other. The manifold 12 further has a front 36 and a back 38 spaced apart with respect to other along a forward-rearward direction 6 that is perpendicular to the vertical direction 2 and the lateral direction 4. The first side 34a and the second side 34b extend from the front 36 to the back 38 and also from the base 30 to the top 32. The forward-rearward direction 6 is referred to as the machine direction and the lateral direction 4 is referred to as the cross-machine direction. The directional components described in this paragraph also apply to components of the applicator 10.

Figure 6:
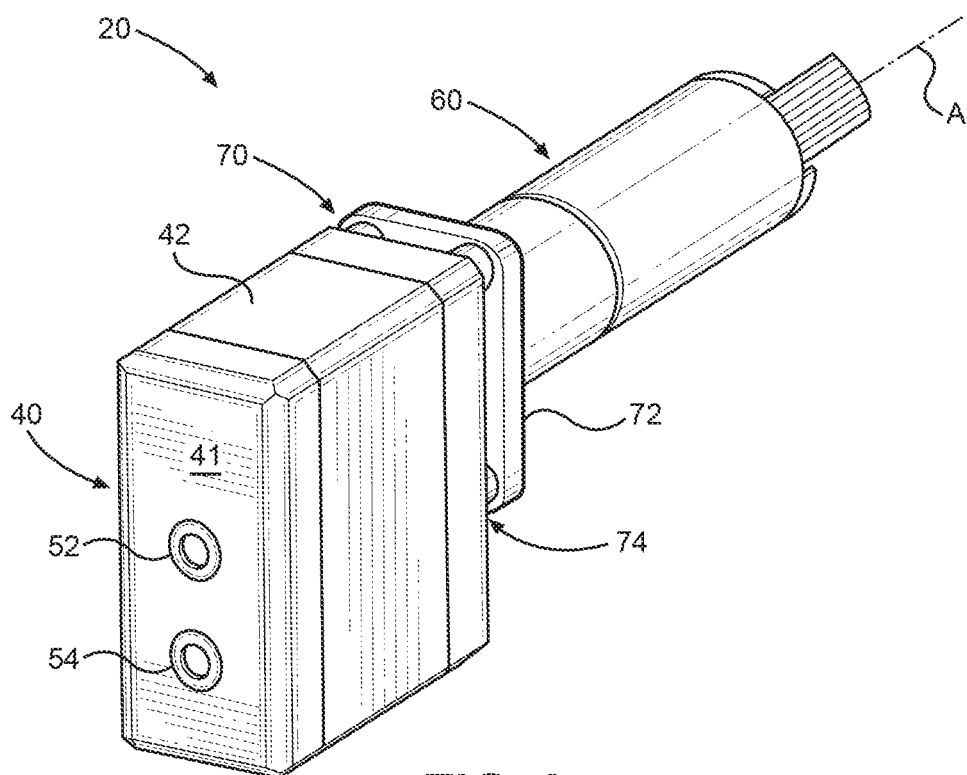
FIG. 6 is a front perspective view a pump assembly used in the applicator shown in FIG. 1.
Figure 7:
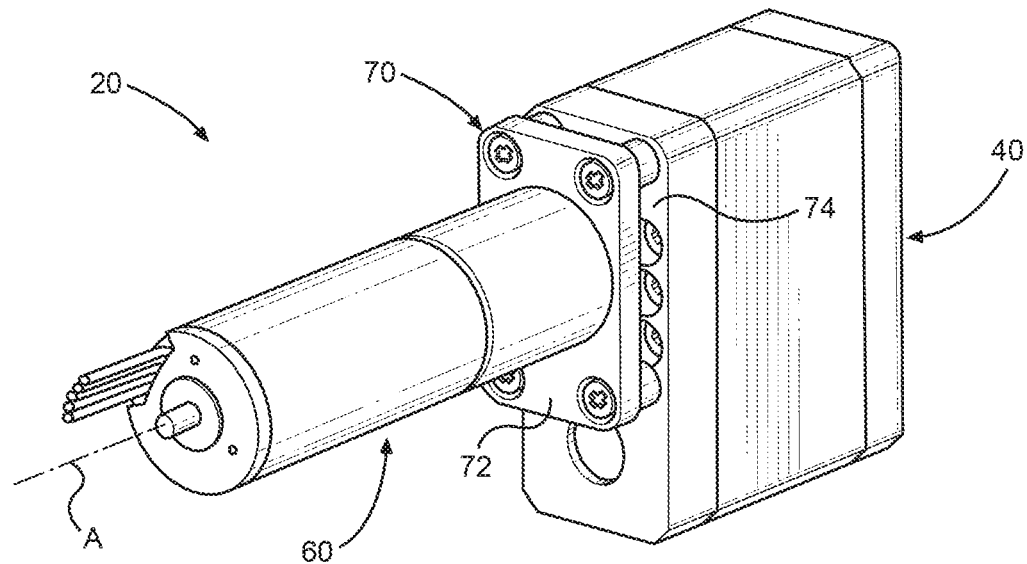
FIG. 7 is a rear perspective view a pump assembly used in the applicator shown in FIG. 1.
Figure 8:
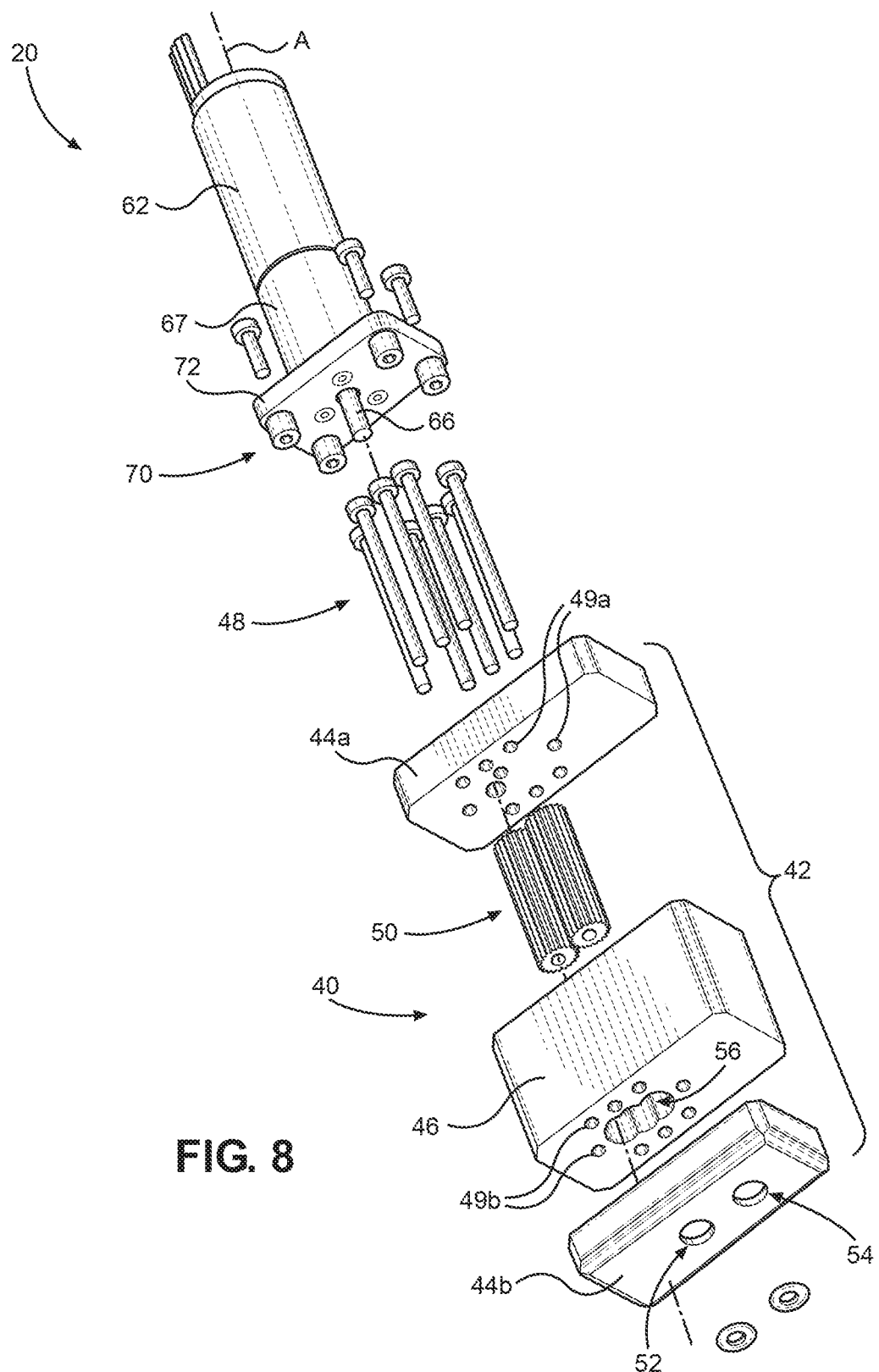
FIG. 8 is an exploded view the pump assembly shown in FIGS. 6 and 7.

Referring to FIGS. 6-8, the pump assembly 20 is configured to supply heated adhesive to the manifold 12 at a given volumetric flow (or flow rate). Each pump assembly 20a-20e includes a pump 40 and a dedicated drive motor unit 60 that powers the pump 40. Because each pump 40 has a dedicated drive motor unit 60, the each pump assembly 20 can be independently controlled by the operator and/or a control system 110 (reference 110 shown in FIG. 11), as will be described further below. The pump assembly 20 also includes a thermal isolation region 70 between the pump 40 and the drive motor unit 60. Thermal elements 23 may be used to elevate the temperature of the manifold 12, which in turn, elevates the temperature of the pump 40 in each pump assembly 20. The thermal isolation region 70 minimizes thermal transfer from the pump 40 to the drive motor unit 60, thereby minimizing the affect of temperature on the electronic components in the drive motor unit 60.

Figure 10:
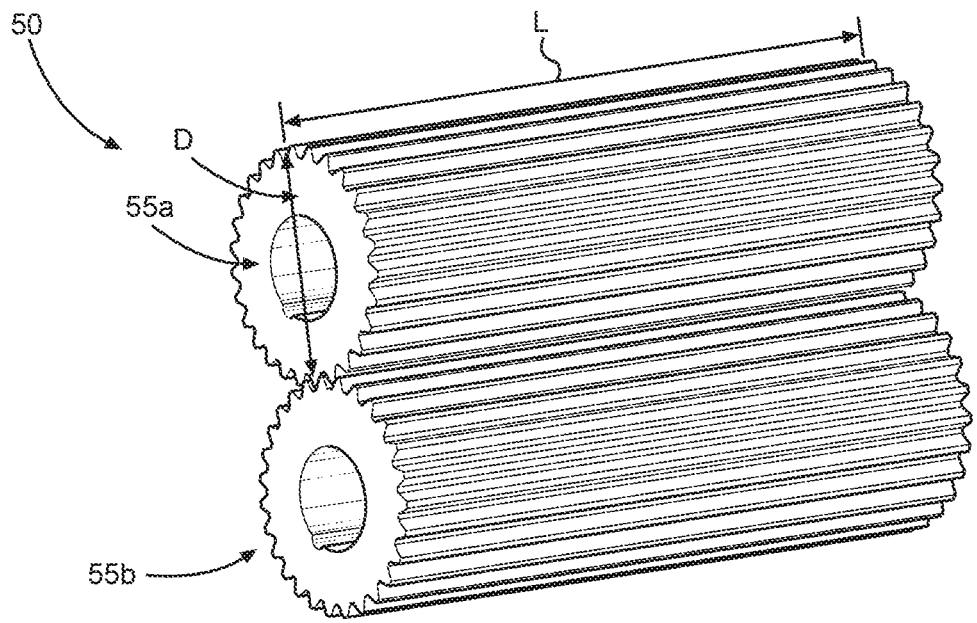
FIG. 10 is a perspective of a gear assembly used in the pump assembly shown in FIGS. 6 and 7.

Continuing with FIGS. 6-8, the drive motor unit 60 includes a motor 62, an output drive shaft 66, and one or more connectors 64 (illustrated as wires) that are coupled to a power source (not shown) and a control unit 150 with a control system 110 (control system 110 and control unit 150 shown in FIG. 10). The drive motor unit 60 may also include a rotational sensor 68 that is electronically coupled to the control unit 150. The drive motor unit 60 may also include a gear assembly 67, such as a planetary gear, that transfers rotational motion from an output drive shaft 66 of the motor to the input drive shaft (not shown) of the pump to attain the desired pump rotational speed. The output drive shaft 66 has a drive axis A about which the drive shaft 66 rotates.

Referring back to FIGS. 3 and 4, the pump assembly 20 may be mounted to the manifold 12 in a number of different configurations. In one example, the pump assembly 20 is mounted to the manifold 12 so that the front surface 41 of the pump 40, which includes the outlet, faces a manifold 12. The drive shaft axis A intersects the front surface 41 of the pump assembly 20 and manifold 12 at a location that is spaced apart from and located between sides 34a and 34b. In this configuration, the drive motor axis A does not intersect the first side 34a and the second side 34b of the applicator 10. Rather, the pump assembly 20 is positioned on the manifold 12 so that the drive motor axis A of the drive motor unit 60 lies in a plane Y that is parallel to the first plane P1 and the second plane P2 of the first side 34a and the second side 34b, respectively. Each pump assembly 20a-20e has a respective drive axis A that lies within a respective plane that is parallel to the first plane P1 and the second plane P2.

Figure 3:
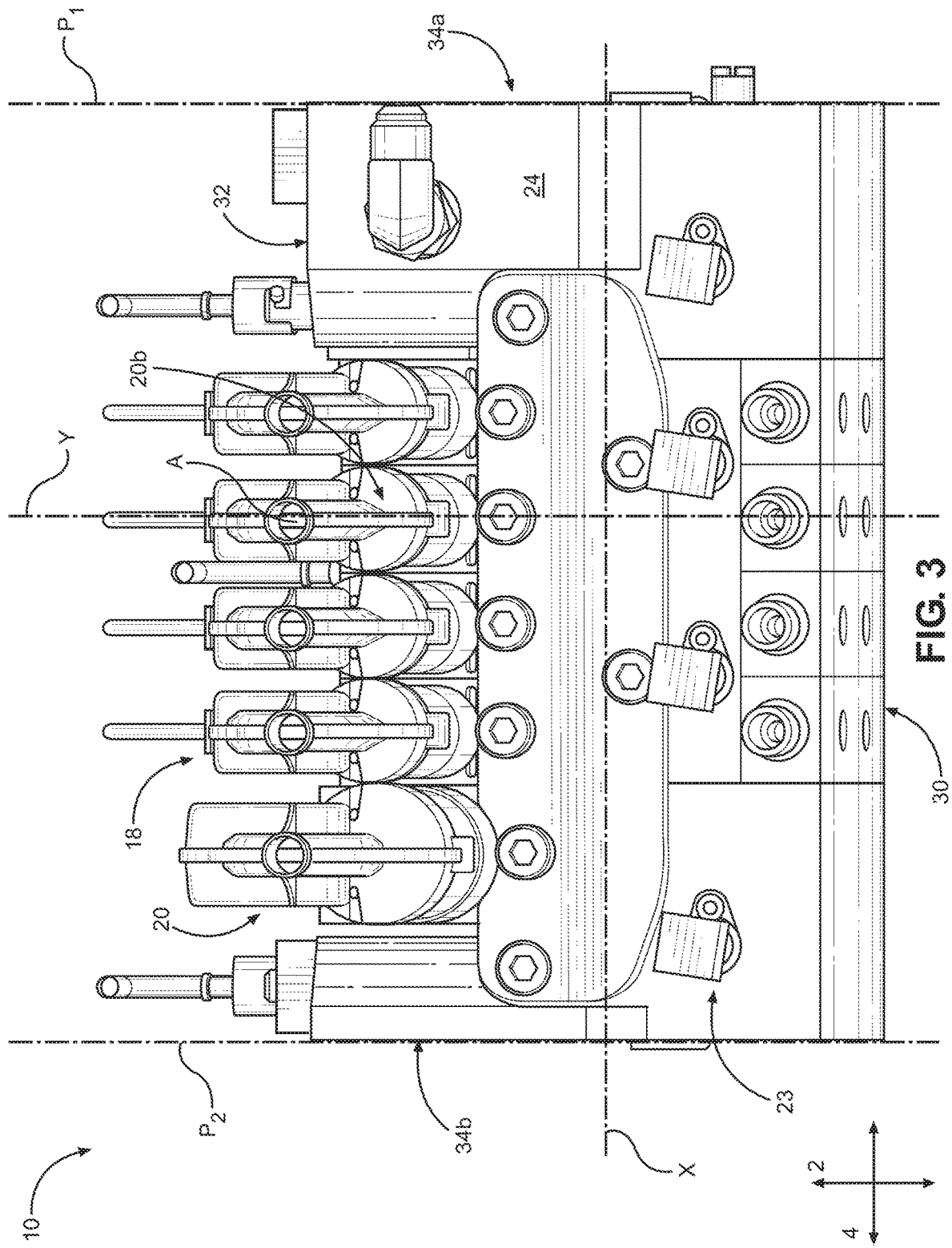
FIG. 3 is a rear view of the applicator shown in FIG. 1.
Figure 4:
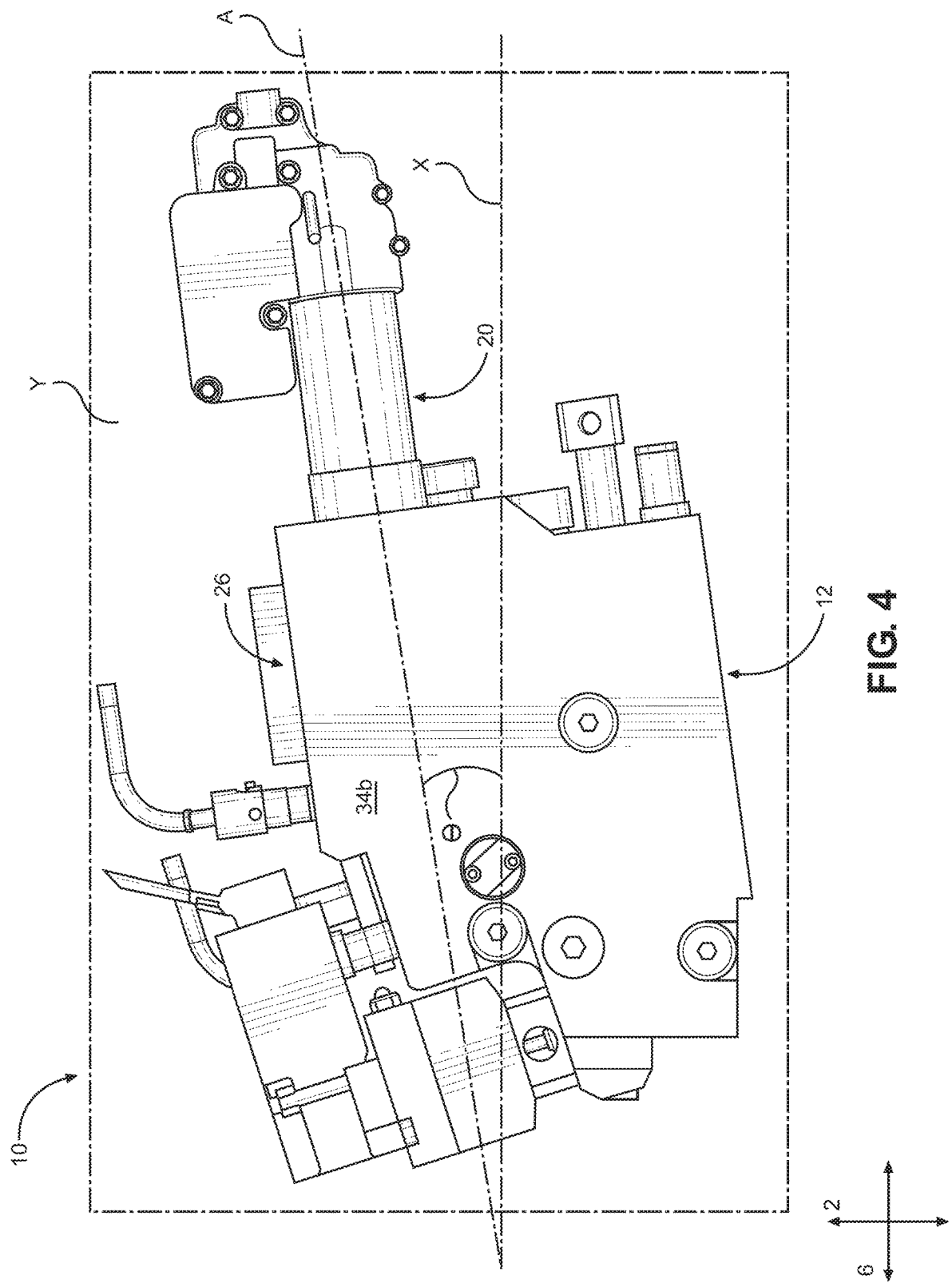
FIG. 4 is a side view of the applicator shown in FIG. 1.

Continuing with FIGS. 3 and 4, it should be appreciated that the pump assembly 20 can be positioned on the manifold 12 such that the drive motor axis A is oriented in any particular direction within plane Y. For example, the pump assembly 20 can be positioned on the manifold 12 such that the drive motor axis A lies within plane Y and is angularly offset with respect to the plane X. For instance, pump assembly 20 can be positioned on the manifold 12 such that the drive motor axis A defines an angle θ with the plane X. The angle θ can be an acute angle, an obtuse angle, or an angle greater than 180 degrees.

Referring to FIGS. 6-8, the pump 40 includes a housing assembly 42 and one or more gear assembly 50 (or more than one gear assembly) contained within the housing assembly 42, an inlet 52 for receiving liquid from the manifold segment 22 and an outlet 54 for discharging liquid back into the manifold segment 22. In accordance with the illustrated embodiment, the inlet and the outlet of the pump are oriented in a direction that is parallel to a drive motor axis A of the drive motor.

Continuing with FIGS. 6-8, the housing assembly 42 comprises an upper plate 44a, a lower plate 44b, and a central block 46. The upper and lower plates 44a and 44b are spaced from each other along a direction that is aligned with a drive axis A of the drive motor unit 60. The upper plate 44a, central block 46, and lower plate 44b are coupled together with bolts 48. The bolts 48 that are received by and fixed within bores 49a, 49b, 49c (not shown) in the upper plate 44a, central block 46, and lower plate 44b, respectively. The central block 46 defines an internal chamber 56 (FIG. 8) sized to conform generally to the profile of the gear assembly 50. The plate 44b defines a front surface 41. The drive motor axis A extends through the front surface 41.

Figure 9:
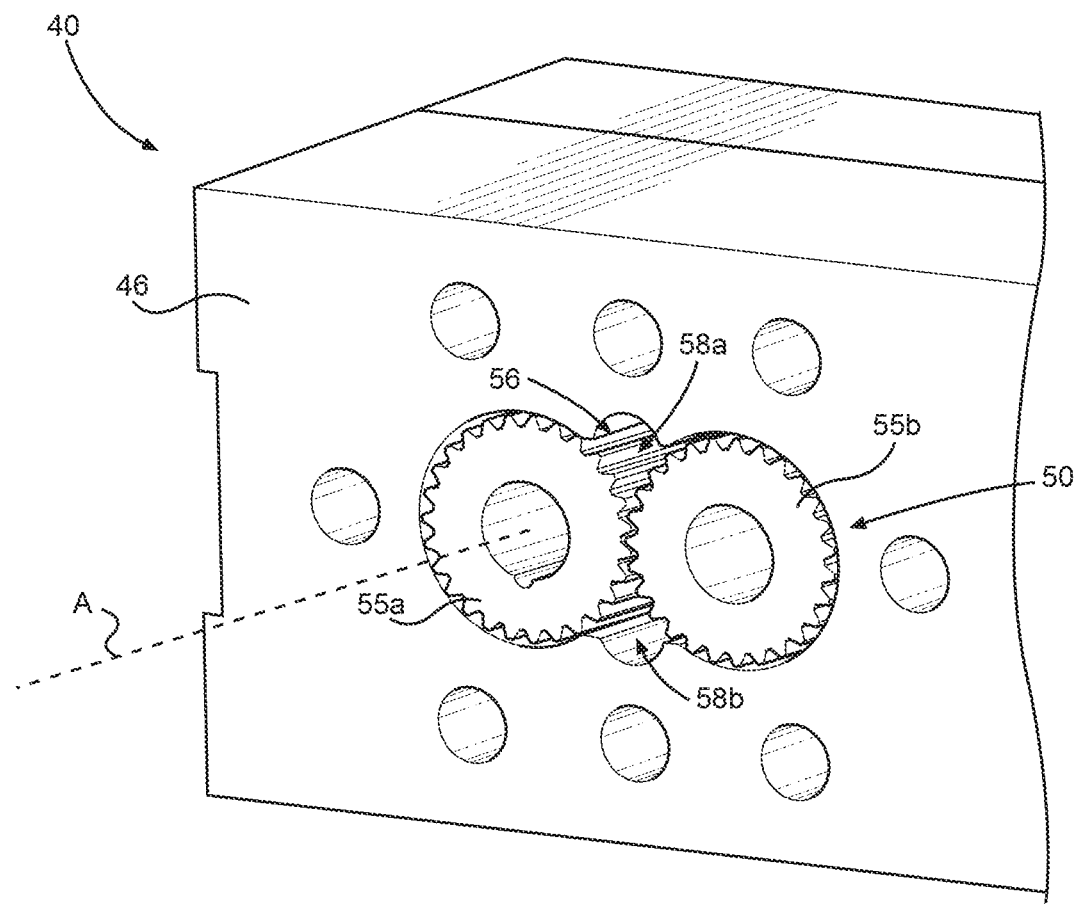
FIG. 9 is a sectional view of the pump assembly shown in FIGS. 6 and 7.

Continuing with FIGS. 8-10, the pump 40 includes a gear assembly 50. In accordance with the illustrated embodiment, the gear assembly 50 has, for example, a driven gear 55a and an idler gear 55b, as is known to a person of ordinary skill in the art. The driven gear 55a is coupled to the drive shaft 66 of the drive motor unit 60 such that rotation of the drive shaft 66 rotates the driven gear 55a, which, in turn, rotates the idler gear 55b. The driven gear 55a rotates about a first axis (not shown) and the idler gear rotates about a second axis (not shown). The driven gear rotational axis is coaxial with the drive motor axis A. The gear assembly 50 may include an elongate gear shaft that is coupled to an end of the drive shaft 66 via a coupling. The gear shaft extends into the driven gear 55a and is keyed to drive the driven gear 55a. A seal member, such as a coating and encasement, can be placed around the elongate gear shaft to facilitate sealing the gear assembly. The elongate gear shaft, coupling, and the sealing member are not shown for clarity.

In use, rotation of the gears 55a and 55b drive adhesive in the pump from a first section 58a of the chamber 56 to a second section 58b of the chamber 56, which is then routed to outlet 54. In accordance with the illustrated embodiment, each gear in gear assembly 50 has a length L that is greater than or equal to its outer diameter D. While a gear assembly with two gears is shown, the pump 40 can have any number of gears and/or any number of gear configurations for the desired flow rate of the pump 40. The central block 46 can be segmented to support gear stacking. For example, a plurality of gear assemblies can be stacked along the pump input shaft. In such an example, the gear assemblies can have different outputs that are combined into a single output stream. In other example, the gear assemblies have different outputs that can be kept separate to provide multiple outputs through additional porting in plate 44b and the manifold 12.

Continuing with FIGS. 6-8, the thermal isolation region 70 is defined by a thermal isolation plate 72 and a gap 74 between the thermal isolation plate 72 and housing assembly 42. Bolts 75 couple the thermal isolation plate 72 to the top of the housing assembly 42 so that the gap 74 is formed between the housing assembly 42 and the thermal isolation plate 72. The thermal isolation plate 72 can include a plurality of spacers 76 that are disposed around the bolts 75 and between a surface of the thermal isolation plate 72 and the housing assembly 42. The spacers 76 can be monolithic with the plate 72 or may be separate from the plate 72 so as to define the depth of the gap 74. The thermal isolation region 70 inhibits transfer of heat from the pump 40 to the drive motor unit 60. The thermal isolation plate 72 and spacers are can be made of material that is a lower thermal conductivity compared the materials that form the housing assembly 42 and the outer casing (not numbered) of the drive motor unit 60. Furthermore, the use of the spacers 76 creates the standoff region 74, which minimizes direct contact between the housing assembly and the drive motor unit 60.

Figure 5:
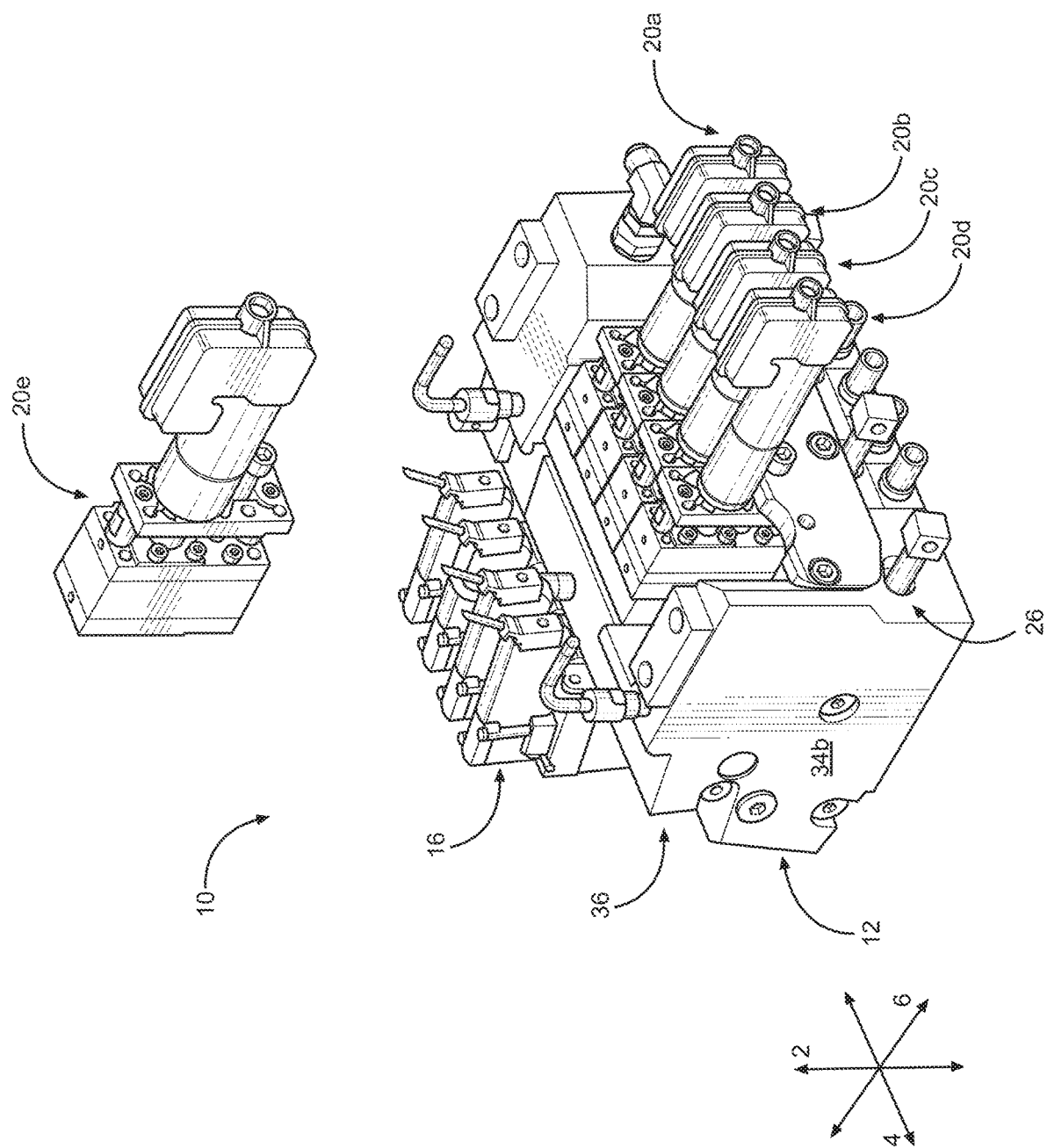
FIG. 5 is a rear perspective view illustrating a pump assembly removed from the applicator.

Referring to FIGS. 4 and 5, the applicator 10 is configured to facilitate removal of a pump assembly 20a-20e from the applicator. As shown in FIG. 4, the pump assemblies 20a-20e are held in place with an elongate plate 27 that is coupled to the end plates 24 and 26. A fastener 29 is coupled to the pump assembly 20 and to the elongate plate 29, thereby securing the pump assembly 20 in place on the manifold 12. The fastener 29 may be a captive fastener. In order to remove and/or replace the pump assembly 20 (or multiple pump assemblies 20a-20e), the operator can loosen the fastener 29 from the elongate plate 29 and then remove the pump assembly 20. This feature reduces the time required to replace and/or remove the pump assembly 20 comparted to typical applicators that use a common drive shaft to operate the pumps.

Figure 11:
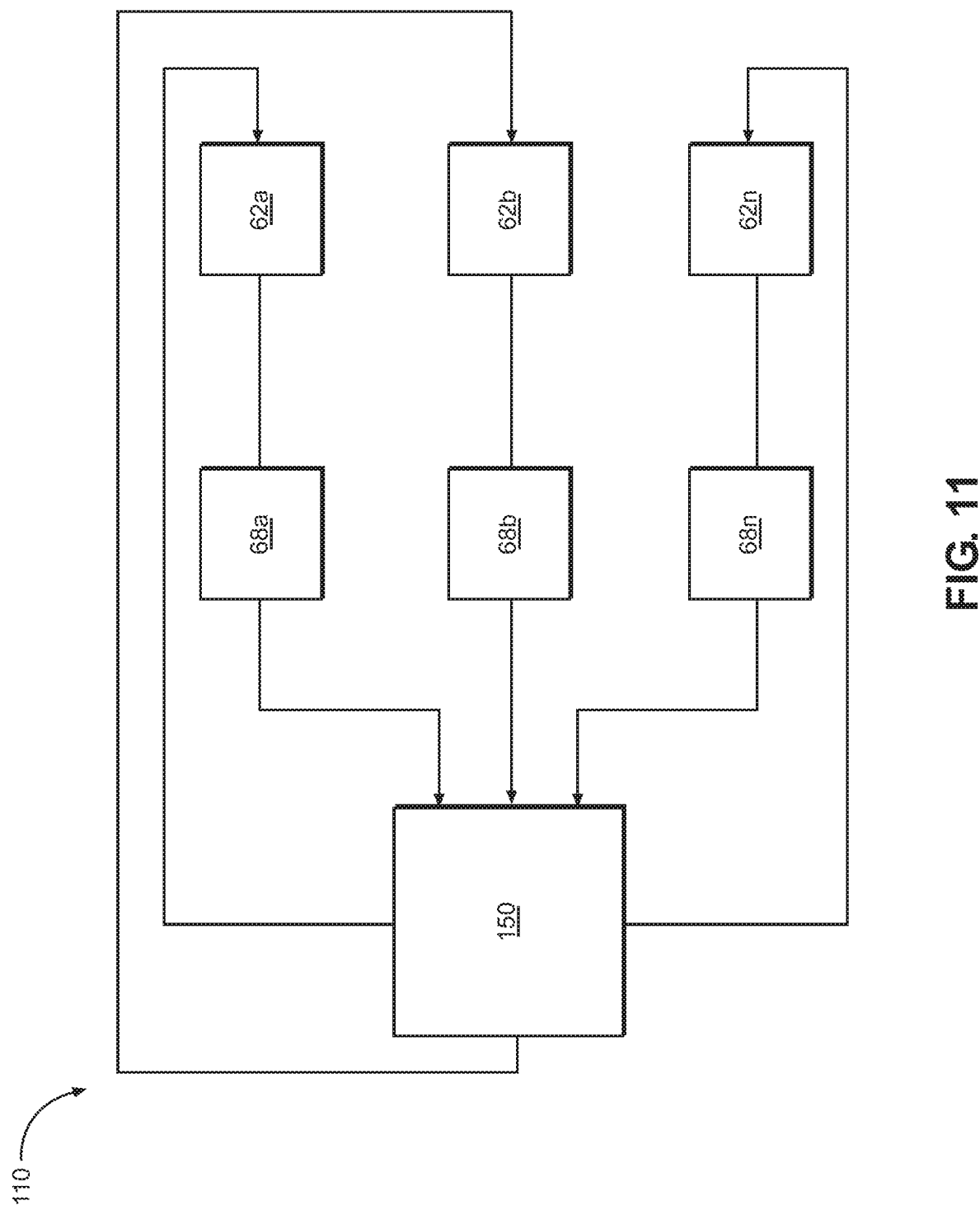
FIG. 11 is a schematic block diagram of a control system used that controls operation of the drive motor unit in the pump assemblies in the applicator shown in FIG. 1.

FIG. 11 is a schematic block diagram a control system 110 configured as a closed feedback loop for controlling aspects of pump assembly 20 operation. As can be seen in FIG. 11, the control system 110 includes at least one control unit 150, which may be a logic unit. In the embodiment where multiple pump assemblies 20a, 20b . . . 20n, are used as illustrated in FIG. 11, the control unit 150 is electronically coupled to rotational sensor 68a, 68b . . . 68n. Each rotational sensor 68a, 68b . . . 68n is coupled to a respective motor 62a, 62b . . . 62n, as described above. The rotational sensors may include rotational encoders, a Hall Effect sensor, and any device that can measure rotation. Alternatively, furthermore, the control unit 150 is also electronically coupled to each motor 62a, 62b . . . 62n. The control unit 150 may include one or more memories, one or more processors used to execute instructions stored in the memory, and input and output portions. The input and output portions may be typical transmit/receive devices that can transmit to and/or receive signals from other components of the control system 110.

The control system 110 operates as a closed loop feedback to maintain pump speeds within a targeted operating range. The control unit 150 may have a target drive motor rotational speed (or "target RPM") set by the operator and stored in memory. The encoder 68 can determine the actual drive motor rotational speed (or the "actual RPM"). The actual RPM is sent to the control unit 150. Software executed by the control unit 150 determines 1) if the actual RPM is different from the target RPM, and 2) the magnitude of variance (+/−) from the target RPM if any is detected. If the control unit 150 determines a variance between target RPM and the actual RPM, the control unit 150 transmits a signal to the motor 62 to either increase or decrease the draft rotational speed until the actual RPM is consistent with the target RPM (within reasonable processing limits typical in metered applications). This feedback loop may be applied across each pump assembly installed on the applicator. In this way, the control system 110 functions to maintain the target rotation speed at the drive motor 62, which in turn, maintain a consistent volumetric flow rate over time. This can limit processing drift that may occur gradually over time in conventional systems. Because each pump assembly is independently driven, the feedback loops for each particular pump assembly help control individual pump outputs.

Figure 12:
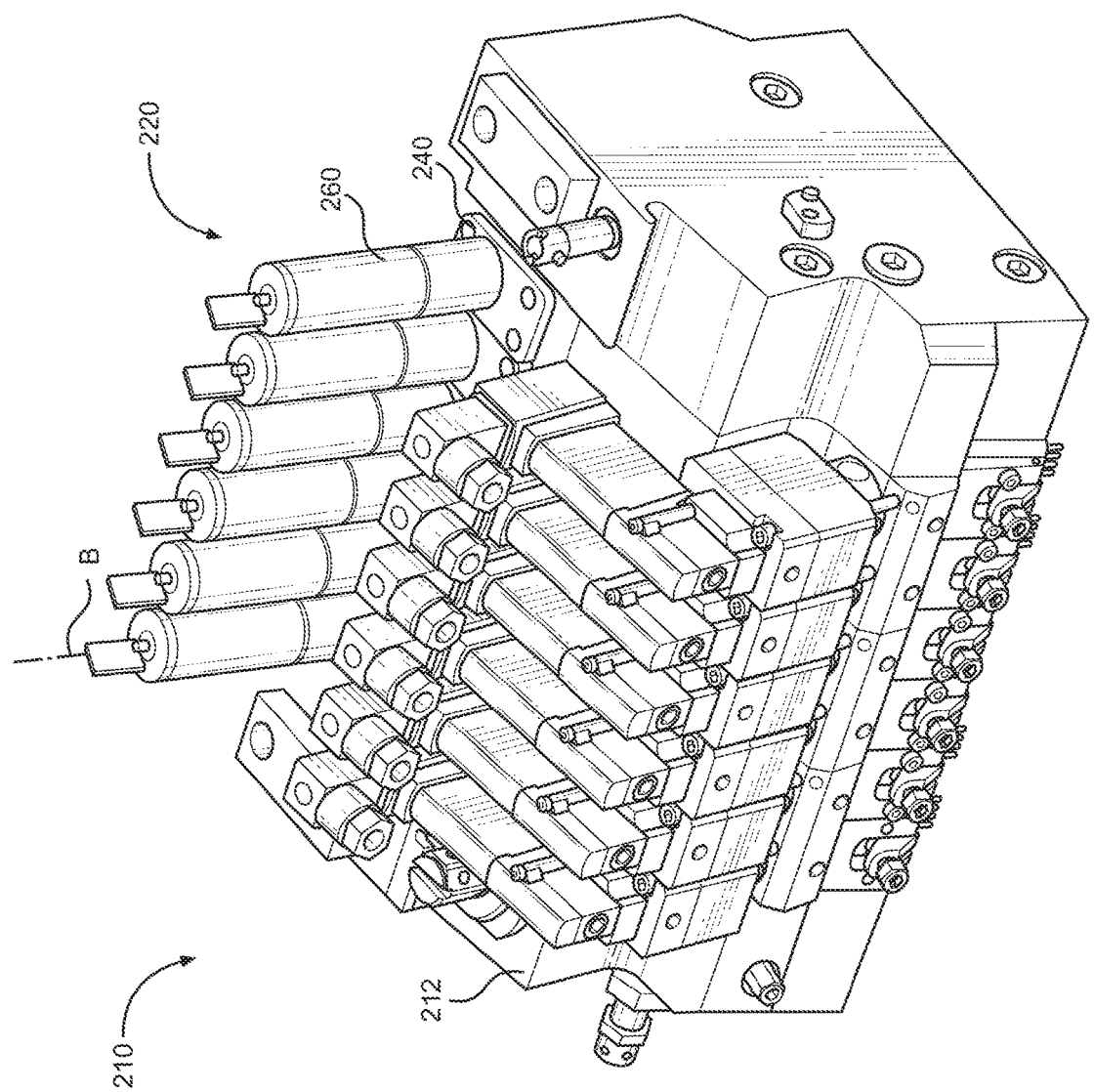
FIG. 12 is a front perspective view of an applicator according to another embodiment of the present disclosure.
Figure 13:
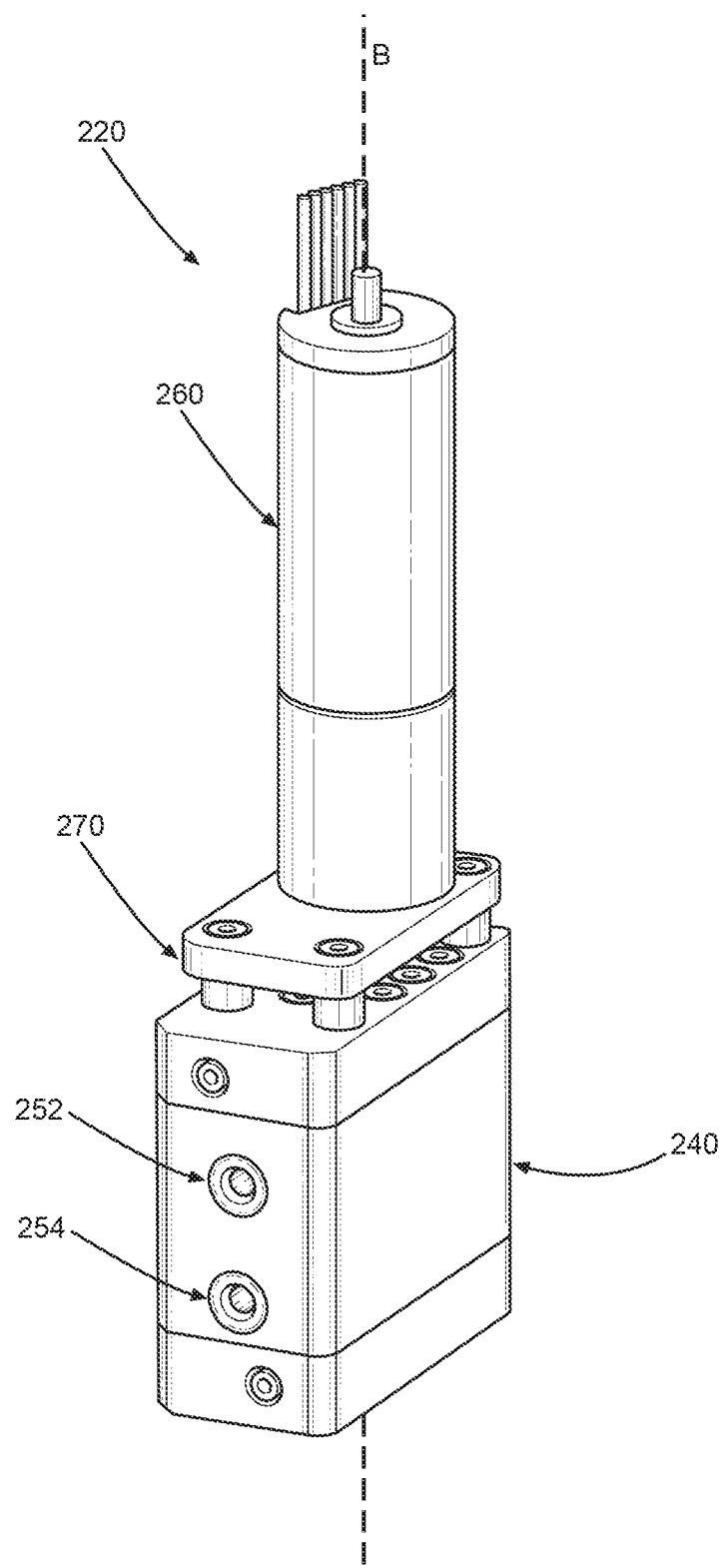
FIG. 13 is a perspective view a pump assembly used in the applicator shown in FIG. 10.
Figure 14:
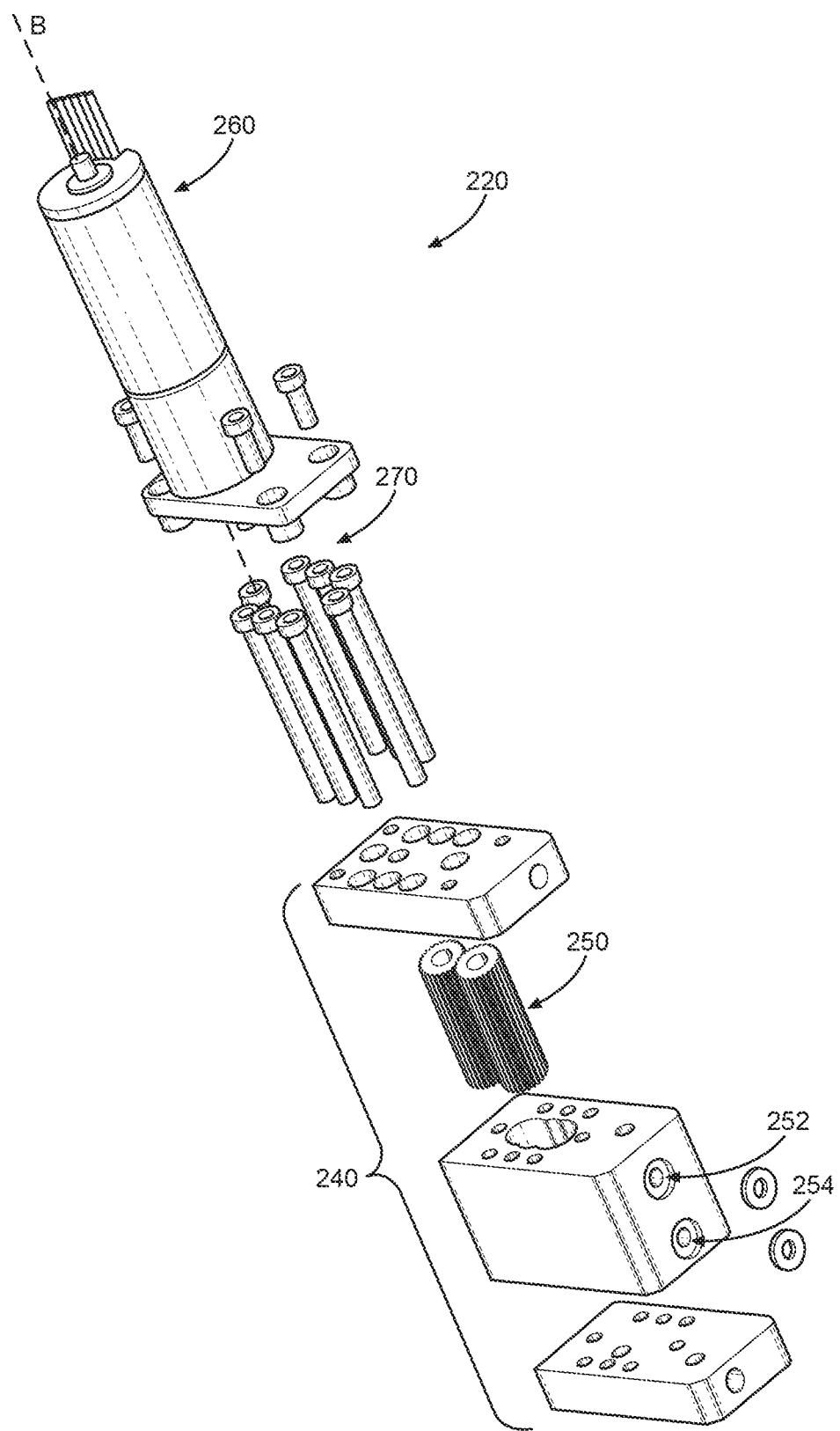
FIG. 14 is an exploded view the pump assembly shown in FIG. 13.

FIGS. 12-14 illustrate another embodiment of the present disclosure. FIG. 12 shows an applicator 210 that is similar to the applicator 10 shown in FIGS. 1-4 and described above. However, the applicator 210 includes pump assemblies 220 that each has drive shaft axes B that are orientated in a direction offset with respect to the lateral direction 4. As illustrated, the pump assembly 220 has a drive motor axis that angularly offset with respect to the vertical plane X and is parallel to the horizontal plane Y. In most other aspects, the applicator 10 and applicator 210 are substantially similar. Accordingly, the same reference signs will be used to identify features that common to the applicator 10 and applicator 210.

Continuing with to FIGS. 12-14, the pump assembly 220 is configured to supply heated liquid to the manifold 12 at a given volumetric flow (or flow rate). Each pump assembly 220 includes a pump 240 and a dedicated drive motor unit 260 that powers the pump 240. The pump assembly 220 may also include a thermal isolation region 270 between the pump 240 and the drive motor unit 260. The thermal isolation region 270 minimizes thermal transfer of heat generated by pump 240 to the drive motor unit 260, thereby minimizing the affect of temperature on the electronic components in the drive motor unit 260. The dedicated drive motor unit 260 and thermal isolation region 270 are same as the drive motor unit 60 and the thermal isolation region 70 described above an illustrated in FIGS. 6-8.

Continuing with FIGS. 12-14, the drive motor unit 260 includes a motor 62 and one or more connectors 64 (illustrated as wires), and an output drive shaft 266. The connectors 64 are coupled to a power source (not shown) and a control system 110. The drive shaft 266 has a drive axis B about which the drive shaft 266 rotates. When the pump assembly 220 is coupled to the applicator 210, the drive axis B intersects and/or is angularly offset with respect to the plane X that is parallel to the plane Y. In this configuration, the drive motor axis B does not intersect the first side 34a and the second side 34b of the applicator 210. Rather, the pump assembly 20 is positioned on the manifold 12 so that drive motor axis B of the drive motor unit 60 lies in a plane Y that is parallel to the first plane P1 and the second plane P2 of the first side 34a and the second side 34b, respectively.

The pump 240 includes a housing assembly 242 and one or more gear assemblies 250 contained within the housing assembly 242, an inlet 252 for receiving liquid from the manifold segment 22 and an outlet 254 for discharging liquid back into the manifold segment 22. In accordance with illustrated embodiment, the inlet and the outlet of the pump 240 are oriented in a direction that is perpendicular to a drive motor axis B of the drive motor unit 260.

The pump assembly 20, 220, 420 as described herein can be independently controlled. For instance, a control system 110 may be used to independently adjust the RPM of the drive motor unit 60. Changes in the drive motor RPM vary the volumetric flow rate of the pump assembly 20 and thus the flow rate of the adhesive exiting the nozzle of the dispensing module. Accordingly, each stream of adhesive exiting the dispensing module may be individually controlled by adjusting the RPM of the drive motor unit 60. Independent adjustment or control of the flow rate at the pump assembly 20 is possible without having to change the pump. Furthermore, the pump assemblies 20 have a wide range of flow rates for given range of RPM compared to conventional pumps used in adhesive applicators. In other words, one pump assembly 20 as described herein has an effective operating range of two or more convention pumps designed for adhesive applicators. Furthermore, such an operating range of the pump is possible in a compact size.

In conventional pumps used with hot-melt adhesives, it is necessary to change the pumps to vary the flow rate outside of the certain operating ranges. For example, one gear set within a pump may be designed for a range of flow rates given a set of input rotational speeds. To achieve higher flow rates (or lower flow rates), a different pump with the gear set designed for the higher (or lower) flow rates must be used. Table 1 below include the volumetric flow rates in cubic centimeter per minute (cc/min) for a conventional small pump ("Pump 1"), a conventional large pump ("Pump 2") and the pump assembly 20, 120, 420 as described in the present disclosure. Pump 1 in the table below has a cubic centimeter per revolution (cc/rev) of 0.16. Pump 2 in the table below has a cc/rev of 0.786. The "pump assembly" in the table below has a cc/rev of 0.34. Pump 1 and Pump 2 are representative of the smaller sized pumps and larger (or largest) sized pumps, respectively, used in conventional adhesive applicators.

TABLE 1

| RPM | Pump 1 (0.16 cc/rev) | Pump 2 (0.786 cc/rev) | Pump Assembly (0.34 cc/rev) |
| --- | --- | --- | --- |
| 10 | 1.6 | 7.86 | 3.4 |
| 20 | 3.2 | 15.72 | 6.8 |
| 30 | 4.8 | 23.58 | 10.2 |
| 40 | 6.4 | 31.44 | 13.6 |
| 50 | 8 | 39.3 | 17 |
| 60 | 9.6 | 47.16 | 20.4 |
| 70 | 11.2 | 55.02 | 23.8 |
| 80 | 12.8 | 62.88 | 27.2 |
| 90 | 14.4 | 70.74 | 30.6 |
| 100 | 16 | 78.6 | 34 |
| 110 | 17.6 | 86.46 | 37.4 |
| 120 | 19.2 | 94.32 | 40.8 |
| 130 | 20.8 | 102.18 | 44.2 |
| 140 | 22.4 | 110.04 | 47.6 |
| 150 | 24 | 117.9 | 51 |
| 160 | | | 54.4 |
| 170 | | | 57.8 |
| 180 | | | 61.2 |
| 190 | | | 64.6 |
| 200 | | | 68 |
| 210 | | | 71.4 |
| 220 | | | 74.8 |
| 230 | | | 78.2 |
| 240 | | | 81.6 |
| 250 | | | 85 |
| 260 | | | 88.4 |
| 270 | | | 91.8 |
| 280 | | | 95.2 |
| 290 | | | 98.6 |
| 300 | | | 102 |

As can be seen in the table above, the pump assembly 20, 220, 420 (pump assembly 420) as described herein has a wide range of volumetric flow rates for a given range of motor RPM's. For pump speed of 10-150 rpm, the volumetric flow rate for Pump 1 ranges from 1.6 to 24 cc/min, and the volumetric flow rates for Pump 2 ranges from 7.86 to 117.9 cc/min. The pump assembly 20, 220, 420 can provide a range of volumetric flow rates that is as wide as the flow rates of two different conventional pumps, at a wide range of pump speeds. In other words, the pump assembly 20, 220, 220 is operable to provide a volumetric flow rate that current typical pumps require two different pumps to accomplish. This results in greater process flexibility because each pump assembly can be separately controlled to provide a targeted flow volumetric among a wider range of possible volumetric flow rate. Furthermore, this level of control, and possible variation, is possible across multiple pumps and adhesive streams.

Furthermore, the pump assemblies 20, 220, 420 offer the operator more in-process flexibility. In conventional pumps used with hot-melt adhesives, the only way to change or adjust the RPM of the pumps was to the change the RPM of the common drive shaft driving each pump. Because a common drive shaft is used to drive the pumps, different pumps are used across the width of the applicator in order to vary the flow rate across the width of the applicator. Increasing (or decreasing) the RPM of the common drive draft resulted in the same increase (or decrease) in flow rates across all of the pumps. Thus, conventional pumps designs limit the ability to adjust process parameters, such as volumetric flow rate across the width, in-line. Rather, to change flow rates outside the desirable operating ranges of the pumps installed on the machine, the pumps must be replaced with the pumps sized for the application. As discussed above, replacing typical pumps is time intensive and complex. The pump assembly as described herein allows for individual pump control while also minimizing removal/replacement times.

There are several additional advantages to using the applicator and pump assembly. As noted above, volumetric displacement of each pump assembly within an adhesive applicator can be controlled independently. With independent displacement control of adjacent pumps along the applicator length, differential flow rates can now be varied by changing the drive motor speed. Less pump assemblies are required for a wide range of processing needs, e.g. a wide flow rates. This reduces part numbers and helps manage product changeover during use. Furthermore, adhesive flow streams can be easily added (or removed).

Figure 15:
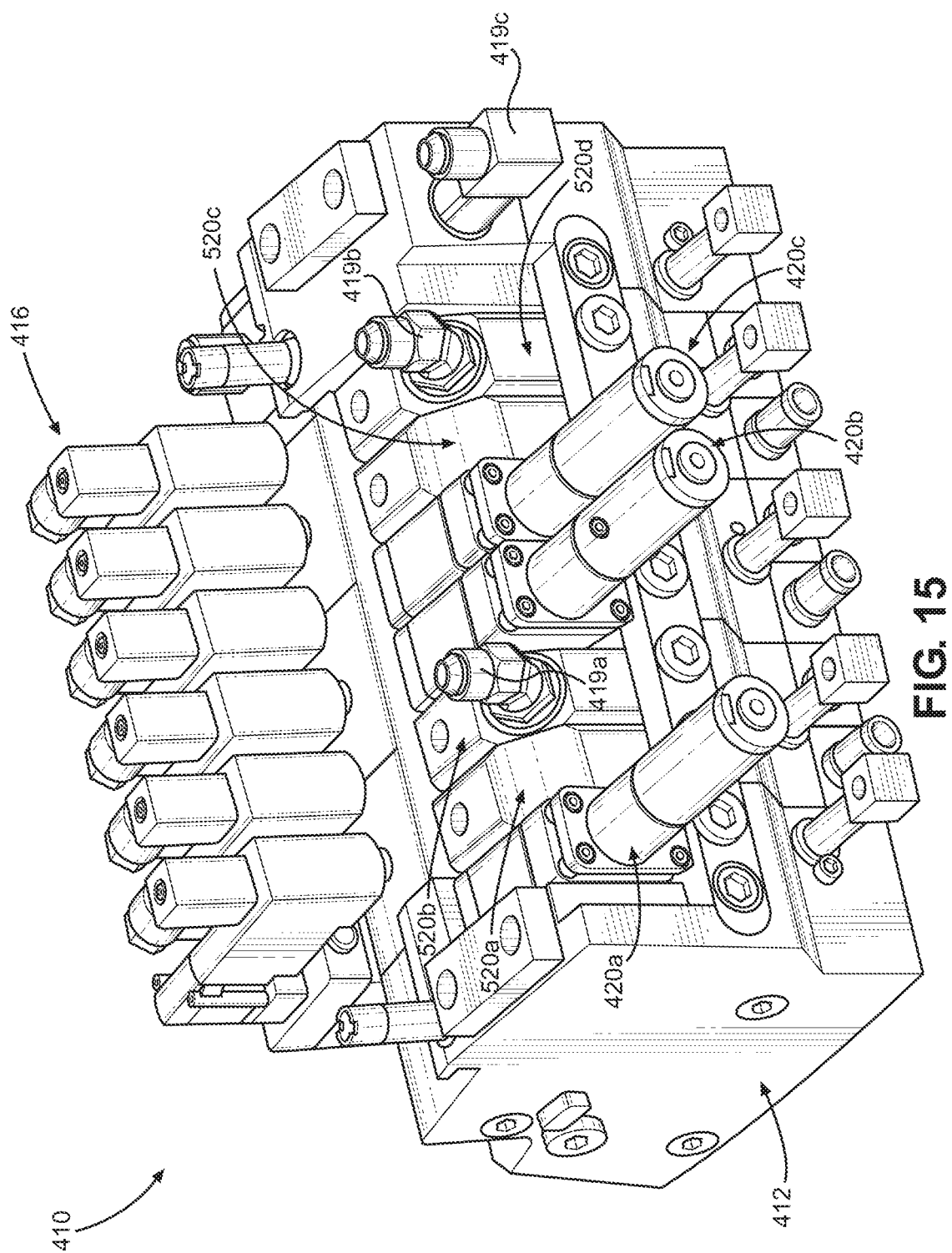
FIG. 15 illustrates an applicator configured for metered and pressure feed inputs.

Another embodiment of the present disclosure is a hybrid applicator for dispensing hot-melt adhesive. FIG. 15 illustrates an applicator 410. The hybrid applicator 410 is configured for both metered output and pressure fed output. The applicator 410 is similar to the applicator 10 and 210 described above. For instance, the hybrid applicator 410 includes dispensing module(s) 416, air control valves(s) a manifold 412 (segmented or unitary).

The hybrid applicator 410 includes at least one pump assembly 420 (or pump assembly 220) and at least one pressure feed block 520, each of which is coupled to the manifold. In the present disclosure reference number 420 can be used interchangeably with the reference number 420a-420c unless noted otherwise. In accordance with the embodiment illustrated in FIG. 15, the applicator 10 includes three pump assemblies 420a, 420b and 420c, and four pressure feed blocks 520a, 520b 520c and 520d. However, the applicator 410 can include any number of pump assemblies and pressure feed blocks.

Continuing with FIG. 15, the pump assembly 420 is substantially the same as pump assembly 20 (or pump assembly 220) described above. The pump assembly 420 receives adhesive from flow channels in the manifold which are ported to the input 419c. Pressure feed blocks 520a and 520c include inlet and outlets that receive adhesive from the manifold supplied through the input 419c. The pressure feed blocks 520b and 520d are supplied adhesive through inputs 419a and 419b. The inputs 419a and 419b receive adhesive from a melting unit (not shown) located upstream. A pump (not shown) near the melting unit is used to feed adhesive through hoses to inputs 419a and 419b coupled to the pressure feed blocks 520b and 520d, respectively. Heat from the manifold 412 is transferred to the pressure feed blocks 520a-520d thereby heating the adhesive within the pressure feed block 520. As shown, the hybrid applicator 410 has multiple input fittings 419a-419c, some which are associated with a pressure feed block(s), can be used to supply different types of adhesives to the applicator.

Combining a pump assembly 420 with a pressure feed block 520 increases process flexibility to the applicator 410. For example, the pump assembly 420 permits precise metering of adhesive streams from the dispensing module, while other adhesive streams are associated with the less precise pressure fee blocks 520. It should be appreciated that the hybrid applicator 410 can be metered, pressure-fed, and multi-zone pressure-fed, all in a single manifold as needed.

While the disclosure is described herein using a limited number of embodiments, these specific embodiments are not intended to limit the scope of the disclosure as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

What is claimed is:

1. An applicator for dispensing adhesive onto a substrate, the applicator comprising:
    a manifold having a front, a back opposite to the front, a first side, and a second side that is opposite the first side;
    at least one dispensing module coupled to said manifold; and
    at least one modular pump assembly configured to be removably mounted to said manifold, each of said at least one modular pump assembly comprising:
        an inlet for receiving the adhesive and an outlet in fluid communication with said manifold;
        a gear assembly disposed within a housing assembly; and
        a drive motor unit coupled to said gear assembly and operable for pumping adhesive from said inlet to said outlet, said drive motor unit having:
            a housing that defines a first end, and a second end that is opposite said first end and that faces said gear assembly;
            a drive shaft that extends through said second end and is connected to said gear assembly;
            a drive motor disposed within said housing and that is configured to rotate said drive shaft about an axis that does not intersect both of said first side and said second side of said manifold, wherein said axis extends through said drive motor and said housing assembly such that said drive motor and said housing assembly are aligned with one another along said axis; and
            a thermal isolation region between said drive motor and said gear assembly, said thermal isolation region including a thermal isolation member that spaces said housing and said housing assembly from one another so as to define a gap therebetween.

2. The applicator of claim 1, wherein said axis is aligned within a plane that is substantially parallel to said first side and said second side.

3. The applicator of claim 1, wherein said gear assembly comprises at least one gear having an outer diameter and a length, wherein the length is greater than or equal to said outer diameter.

4. The applicator of claim 1, wherein said manifold comprises a plurality of manifold segments.

5. The applicator of claim 1, further comprising at least one pressure feed block coupled to said manifold.

6. The applicator of claim 1, further comprising a control unit and a rotational sensor coupled to the said control unit and said drive motor, said rotational sensor configured to provide data indicative an actual rotation speed of the drive motor to said control unit, said control unit configured to receive data indicative of a target rotational speed of said drive motor, said control unit configured to a) determine an extent of a variance between said target rotational speed of the drive motor and said actual rotational speed of the drive motor, and b) adjust the rotational speed of said drive motor to reduce the variance.

7. The applicator of claim 1, wherein each said modular pump assembly further comprises a front surface, and wherein said outlet is on said front surface and said axis intersects said front surface.

8. The applicator of claim 1, wherein said inlet and said outlet are oriented in a direction that is perpendicular to said axis.

9. The applicator of claim 1, wherein the at least one modular pump assembly includes a plurality of modular pump assemblies that are independently controlled, such that said drive motor of one of said plurality of modular pump assemblies is configured to pump the adhesive through said outlet thereof at a first targeted volumetric flow rate and said drive motor of another one of said plurality of modular pump assemblies is configured to pump the adhesive through said outlet thereof at a second targeted volumetric flow rate different from said first targeted volumetric flow rate.

10. The applicator of claim 1, wherein said thermal isolation member couples said housing and said housing assembly.

11. A pump assembly configured to connect to a manifold of an applicator for dispensing adhesive, the manifold having a front, a back opposite to the front, a first side, and a second side, the pump assembly comprising:
    an inlet for receiving the adhesive;
    an outlet in flow communication with said manifold;
    a gear assembly disposed within a housing assembly;
    a drive motor unit coupled to said gear assembly and operable for pumping adhesive from said inlet to said outlet, said drive motor unit having a housing that defines a first end and a second end that is opposite said first end and faces said gear assembly, a drive shaft that extends through said second end and is connected to said gear assembly, and a drive motor disposed within said housing that is configured to rotate said drive shaft about an axis that extends through said drive motor and does not intersect both of the first side and the second side of the manifold when the pump assembly is connected to the manifold, wherein said axis extends through said drive motor and said housing assembly such that said drive motor and said housing assembly are aligned with one another along said axis; and
    a thermal isolation region between said drive motor and said gear assembly, said thermal isolation region including a thermal isolation member that spaces said housing and said housing assembly from one another so as to define a gap therebetween.

12. The pump assembly of claim 11, wherein said gear assembly comprises at least one gear having an outer diameter and a length, wherein the length is greater than or equal to said outer diameter.

13. The pump assembly of claim 11, further comprising a front surface, wherein said outlet is on said front surface and said axis intersects said front surface.

14. The pump assembly of claim 11, wherein said axis is aligned within a plane that is substantially parallel to said first side and said second side.

15. The pump assembly of claim 11, further comprising a control unit and a rotational sensor coupled to the said control unit and said drive motor unit, said rotational sensor configured to provide data indicative an actual rotation speed of the drive motor unit to said control unit, said control unit configured to receive data indicative of a target rotational speed of said drive motor unit, said control unit configured to a) determine an extent of a variance between said target rotational speed of the drive motor unit and said actual rotational speed of the drive motor unit, and b) adjust the rotational speed of said drive motor unit to reduce the variance.

16. The pump assembly of claim 11, wherein said inlet and said outlet are oriented in a direction that is perpendicular to said axis.

17. The pump assembly of claim 11, wherein said thermal isolation member couples said housing and said housing assembly.

18. An applicator, comprising:
a plurality of pump assemblies according to claim 11, wherein each of said pump assemblies is independently controlled, such that said drive motor of one of said plurality of pump assemblies is configured to pump the adhesive through said outlet thereof at a first targeted volumetric flow rate and said drive motor of another one of said plurality of pump assemblies is configured to pump the adhesive through said outlet thereof at a second targeted volumetric flow rate different from said first targeted volumetric flow rate.

19. An applicator for dispensing adhesive onto a substrate, the applicator comprising:
a manifold having a front, a back opposite to the front, a first side, and a second side that is opposite the first side;
at least one dispensing module coupled to said manifold; and
at least one modular pump assembly configured to be removably mounted to said manifold, each of said at least one modular pump assembly comprising:
an inlet for receiving the adhesive and an outlet in fluid communication with said manifold;
a gear assembly disposed within a housing assembly;
a drive motor unit coupled to said gear assembly and operable for pumping adhesive from said inlet to said outlet, said drive motor unit having a housing that defines a first end and a second end that is opposite said first end and faces said gear assembly, a drive shaft that extends through said second end and is connected to said gear assembly, and a drive motor disposed within said housing that is configured to rotate said drive shaft about an axis that does not intersect both of said first side and said second side of said manifold;
a plate integral with the housing of the drive motor unit, wherein the plate is directly attached to the housing assembly; and
a thermal isolation region defined between the plate and the housing assembly.

20. The applicator of claim 19, wherein the housing assembly comprises:
an upper plate partially defining the thermal isolation region;
a lower plate opposite the upper plate and defining the inlet and the outlet; and
a central block positioned between the upper and lower plates.

21. The applicator of claim 19, wherein the at least one modular pump assembly further comprises:
at least one fastener securing the housing assembly to the plate.

* * * * *